United States Patent [19]
Li et al.

[11] Patent Number: 6,094,653
[45] Date of Patent: Jul. 25, 2000

[54] DOCUMENT CLASSIFICATION METHOD AND APPARATUS THEREFOR

[75] Inventors: Hang Li; Kenji Yamanishi, both of Tokyo, Japan

[73] Assignee: NEC Corporation, Tokyo, Japan

[21] Appl. No.: 08/998,736

[22] Filed: Dec. 29, 1997

[30] Foreign Application Priority Data

Dec. 25, 1996 [JP] Japan ................................. 8-356219

[51] Int. Cl.⁷ .................................................. G06F 17/30

[52] U.S. Cl. ...................... 707/6; 707/3; 707/5; 704/257

[58] Field of Search ................................. 707/5, 6, 3, 10, 707/101; 704/257; 345/440, 326

[56] References Cited

U.S. PATENT DOCUMENTS

| | | | |
|---|---|---|---|
| 5,625,767 | 4/1997 | Bartell et al. | 707/5 |
| 5,675,819 | 10/1997 | Schuetze | 704/10 |
| 5,680,511 | 10/1997 | Baker et al. | 704/257 |
| 5,687,364 | 11/1997 | Saund et al. | 707/6 |
| 5,835,893 | 11/1998 | Usioda et al. | 704/257 |

*Primary Examiner*—Hosain T. Alam
*Assistant Examiner*—Thu-Thao Havan
*Attorney, Agent, or Firm*—Young & Thompson

[57] ABSTRACT

A document classification system and method classifies words into word clusters. Word clusters are arranged for categories of documents and a word falls into a word cluster at a probability. A linear combination model using a distribution of word clusters in a category and a distribution of words in the word cluster probabilistically indicates whether a document is in a particular category.

2 Claims, 5 Drawing Sheets

---

301

The document classification section 6 receives documents inputted by the document input section 5.

302

The document classification section 6 refers the distribution of word clusters falling in the individual categories and being stored in the word cluster distribution memory section 2 and also refers the distribution of the words falling into the word clusters and being stored in the word distribution memory section 3.

303

The document classification section 6 corresponds the individual categories with linear combination models of the word luster distributions of those categories and the word distributions of the individual word clusters for regarding the inputted documents to be data and subsequent calculation of negative logarithm likelihood of the linear combination models corresponding to the individual categories based on the data so as to classify the documents in the category corresponding to the linear combination model having the smallest negative logarithm likelihood.

DOCUMENT CLASSIFICATION METHOD AND APPARATUS THEREFOR

BACKGROUND OF THE INVENTION

The present invention relates to a document classification method and an apparatus therefor, and more particularly to a method an apparatus for automatic classification of Internet homepages, retrieval of literature in an electronic library, retrieval of information about patent applications, automatic classification of electronic newspaper stories, and automatic classification of multimedia information.

In the field of classification and retrieval of information, development of an apparatus for document classification or sentence classification and text classification would be important. For document classification, some of categories have previously been set for determining which categories the individual documents fall into so as to classify the documents into the categories. A result of the classification is then stored in the system whereby the system could obtain a certain knowledge from the information stored therein, for which reason the system can implement the automatic classification based upon the obtained knowledge.

In the prior art, some types of the document classification systems have been known and proposed. The document classification system proposed by Salton et al. has been well-known and is disclosed in G. Salton and M. J. McGill, "Introduction to Modern Information Retrieval", New York : McGraw Hill 1983. A cosine of an angle defined between a frequency vector of words in the document and a frequency vector of words in the category is regarded as a distance between the document and the category and the document classification into the category is implemented so as to minimize the distance between the document and the category.

Another document classification system proposed by Guthrie et al. is also attractive. The words are sorted into clusters. This system is, for example, disclosed in Guthrie et al., "Document Classification by Machine: Theory and Practice," Proceedings of the 15$^{th}$ International Conference on Computational Linguistics (COLING'94) pages 1059–1063, 1994.

FIG. 1 is a block diagram illustrative of the configuration of the document classification system proposed by Guthrie et al. The document classification system comprises a document input section 505, a document classification section 503, a word cluster distribution memory section 502, a category storage section 501, and a learning section 504. Words or key-words and terms in the document are classified into word clusters so that the document is classified based upon a distribution of appearance of the word clusters. This document classification system proposed by Guthrie et al. can implement the word classification into the clusters at a higher accuracy than that of the document classification system proposed by Salton et al.

A brief description of the document classification system proposed by Guthrie et al. will be made by way of example. Previously, two categories of "baseball" and "soccer" have been set by a user. A determination of the category into which the document falls is made for the document classification into the two categories and subsequent storage of information thereof into the category storage section 501. In this case, one example of the frequency of appearance of the words in the documents classified into the two categories of "baseball" and "soccer" is shown in the following Table 1.

TABLE 1

| Category/Word | base | pitcher | goal | game | spectator |
|---|---|---|---|---|---|
| Baseball | 3 | 1 | 0 | 3 | 2 |
| Soccer | 0 | 0 | 3 | 3 | 2 |

The learning section 504 prepares a word cluster "baseball" for the category "baseball" and also prepares a word cluster "soccer" for the category "soccer". If a word did not appear in the document classified into the category "soccer" but did appear one time or more in the document classified into the category "baseball", then this word is classified into the word cluster "baseball". If, however, another word did not appear in the document classified into the category "baseball" but did appear one time or more in the document classified into the category "soccer", then this other word is classified into the word cluster "soccer". The remaining words other than the above are classified into a word cluster "the others".

As a result of the above classification, three word clusters could be obtained as shown in the following Table 2.

TABLE 2

| Cluster "Baseball": | base, pitcher |
|---|---|
| Cluster "Soccer": | goal |
| Cluster "The Others": | game, spectator |

Based upon the information about the frequency of appearance of words in individual categories, the words "base" and "pitcher" are classified into the cluster "baseball". The word "goal" is classified into the cluster "soccer". The words "game" and "spectator" are classified into the cluster "the others".

Further, the frequency distribution of word cluster appearance in the documents classified into the two categories can also be obtained as shown in the following Table 3.

TABLE 3

| Category/ | cluster "baseball" | cluster "soccer" | cluster "the others" |
|---|---|---|---|
| Baseball | 4 | 0 | 5 |
| Soccer | 0 | 3 | 5 |

The learning section 504 provides correspondences of the distributions of the word clusters to the categories for subsequent presumption of the word cluster distribution by use of a Laplace estimation thereby to store the obtained word cluster into the word cluster distribution memory section 502.

The probability equation of the probability parameters used by the Laplace estimation is given by:

$$P(X=x)=(f(X=x)+0.5)/(F+0.5*k) \qquad (1)$$

where "P(X=x)" means a probability of appearance "x" and "f(X=x)" means a probability of appearance "x" in F times of observations. "k" is the number of kinds of the values of "X".

Further, the frequency distribution of word cluster appearance in the documents classified into the two categories can also be obtained as shown in the following Table 4.

TABLE 4

| Category/ | cluster "baseball" | cluster "soccer" | cluster "the others" |
|---|---|---|---|
| Baseball | 0.43 | 0.05 | 0.52 |
| Soccer | 0.05 | 0.37 | 0.58 |

For the document classification, the document classification section 503 receives new documents from the document input section 505 for subsequent reference thereof to word cluster distribution in individual categories stored in the word cluster distribution memory section 502. The inputted documents are regarded as data to calculate a probability of appearance of data from the word cluster distribution in the individual categories so that the inputted documents are classified into a category corresponding to the largest probability. For example, the above processes are made as follows.

The document classification section 503 receives inputs "spectator", "pitcher", "base", "base" and "goal". The document classification section 503 replaces the words appearing in the inputted document by a word cluster into which the word falls in order to form data such as the cluster "the other", the cluster "baseball", and the cluster "soccer".

The document classification section 503 refers to the word cluster distributions in the categories "baseball" and "soccer" shown on the above Table 4 from the word cluster distribution memory section 502. The above data, such as cluster "the other", the cluster "baseball", and the cluster "soccer" are generated from the word cluster distribution so that a probability of appearance of the data from the word cluster distributions in the categories "baseball" and "soccer" shown on the above Table 4 can be calculated as follows.

Log(probability)(data|category "baseball")

=log 0.52+log 0.43+log 0.43+log 0.43+log 0.05=−8.92.

Log(probability)(data|category "soccer")

=log 0.58+log 0.05+log 0.05+log 0.05+log 0.37=−15.19.

where the calculation is made in the form of logarithm of the probability.

Since the probability from the category "baseball" is larger than the probability from the category "soccer", then the inputted document is classified into the category "baseball".

The above document classification system proposed by Guthrie et al. has the following three problems.

The first problem is that the words classified into the same word cluster are equivalently processed.

For example, the words "base" and "pitcher" are classified into the same word cluster "baseball". If any one of the words "base" and "pitcher" appears, then the word cluster "baseball" is regarded to have appeared. If, however, the frequency of appearance of the word "base" in the document is higher than that of the word "pitcher" in the document and further the word "base" appears in a new document, then the new document is ideally required to be classified into the category "baseball" at higher accuracy and confidence than when the "pitcher" appears in the new document. Actually, however, the above document classification system proposed by Guthrie et al. could not do such highly accurate classification.

The second problem is that it is difficult to set a threshold value of word appearance frequency when the word cluster is prepared.

In the above document classification system proposed by Guthrie et al., if a word does not appear in the document classified into the category "soccer" but does appear N times or more in the document classified into the category "baseball", then the word is classified into the word cluster "baseball". On the other hand, if a word does not appear in the document classified into the category "baseball" but does appear N times or more in the document classified into the category "soccer", then the word is classified into the word cluster "soccer".

In the above case, setting the threshold value "N" is important and a large issue. If the threshold value "N" is large, tend the numbers of the words to be respectively classified into the word cluster "baseball" and the word cluster "soccer" are decreased whilst the numbers of the words to be classified into the word cluster "the other" are increased. As a result, in many cases, it is difficult to judge which category into which the inputted documents fall.

On the other hand, if the threshold value "N" is small for example N=1, then the number of the words to be classified into the word clusters "baseball" and "soccer" is increased. However, the word appearing only one time and the word often appearing many times are equivalently dealt with. This means that the accuracy of classification is low.

The third problem is that if a word appears in the documents classified into the plural categories but appears to be biased in the document classified into one category, then it is difficult to effectively utilize the word.

Assume that the words appearing in the documents of the categories "baseball" and "soccer" and the frequencies of the appearances thereof are shown in the following Table 5.

TABLE 5

| Category/Word | base | pitcher | goal | kick | spectator |
|---|---|---|---|---|---|
| Baseball | 3 | 1 | 1 | 0 | 2 |
| Soccer | 0 | 0 | 3 | 1 | 2 |

With reference to the Table 5, the word "goal" mainly appears in the document of the category "soccer" but also appears in the document of the category "baseball".

In the above case, the above document classification system proposed by Guthrie et al. classifies the word "goal" into the word cluster "the other". This means that the above document classification system could not classify the document, where the word "goal" appears into the category "soccer".

In view of the above circumstances, it had been required to develop a novel document classification system free from the above problems and disadvantages.

SUMMARY OF THE INVENTION

Accordingly, it is an object of the present invention to provide a novel document classification system and method free from the above problems.

It is a further object of the present invention to provide a novel document classification system and method which are capable of highly accurate document classifications.

The above and other objects, features and advantages of the present invention will be apparent from the following descriptions.

In accordance with the present invention, for classification of words into the word clusters, a word falls into a word cluster at a probability, and a linear combination model between a distribution of word clusters in a category and a distribution of words in the word cluster is made corresponding to that category.

In the novel document classification system in accordance with the present invention, a category memory section is provided for storing both categories and documents as classified into the categories. A word cluster distribution memory section is provided for storing the distribution of the word cluster in the categories. A word distribution memory section is provided for storing the distribution of words in the word clusters. Categories stored in the category memory section and documents classified into the those categories are referred to each other so as to prepare word clusters corresponding to the individual categories. Linear combination models of the distribution of the word clusters in the individual categories and the distribution of words in the individual word clusters are made for the individual categories, thereby assuming a distribution of words in each of the word clusters. The assumed distribution of words in each of the word clusters is stored in the word distribution memory. Further, a learning means is provided for assuming a distribution of word clusters in each of the categories and for storing the assumed distribution of the word clusters in each of the categories into the word cluster memory section. A document input means is provided for storing newly inputted documents into the document classification section. A document classification means is provided for received the documents newly inputted by the document input means, referring to the word cluster distributions which fall into the individual category and which are stored in the word cluster distribution memory section and also referring to the word distribution in the individual word cluster stored in the word distribution memory section, corresponding the individual categories with the linear combination model, regarding the inputted documents to be data, calculating a negative logarithm likelihood of the linear combination model corresponding to the individual category based on the data, and classifying of a document into the category corresponding to the linear combination model of the smallest negative logarithm likelihood.

BRIEF DESCRIPTION OF THE DRAWINGS

Preferred embodiments according to the present invention will be described in detail with reference to the accompanying drawings.

DESCRIPTION OF THE PREFERRED EMBODIMENTS

Figure 1:
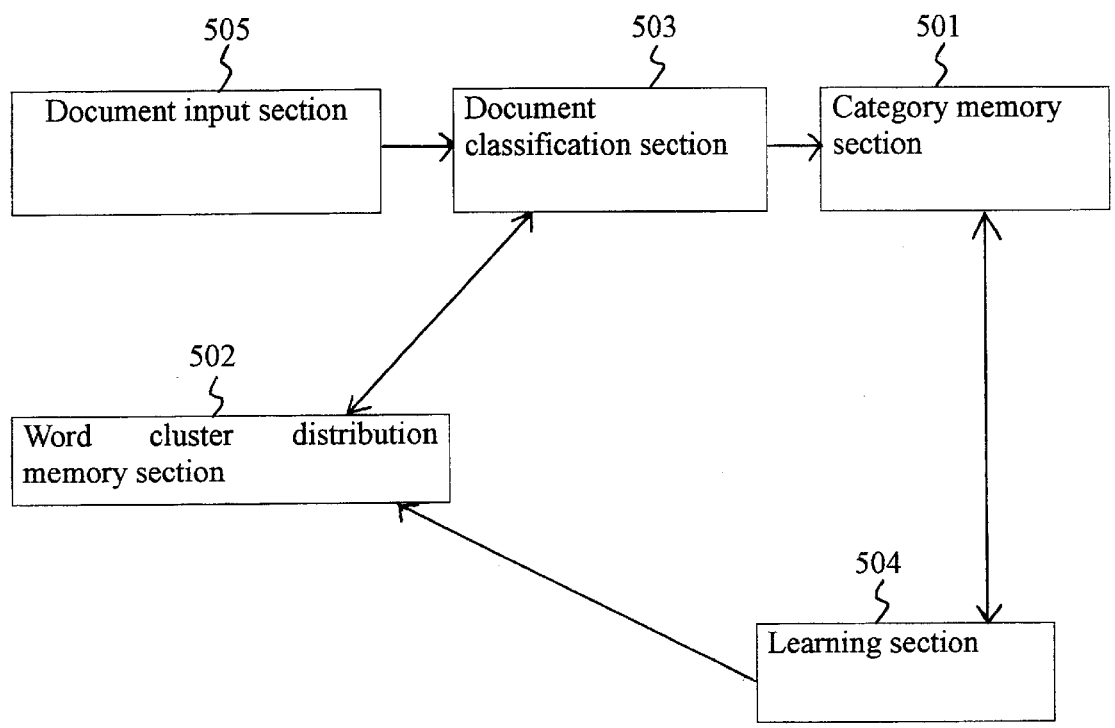
FIG. 1 is a block diagram illustrative of the configuration of the conventional document classification system proposed by Guthrie et al.
Figure 2:
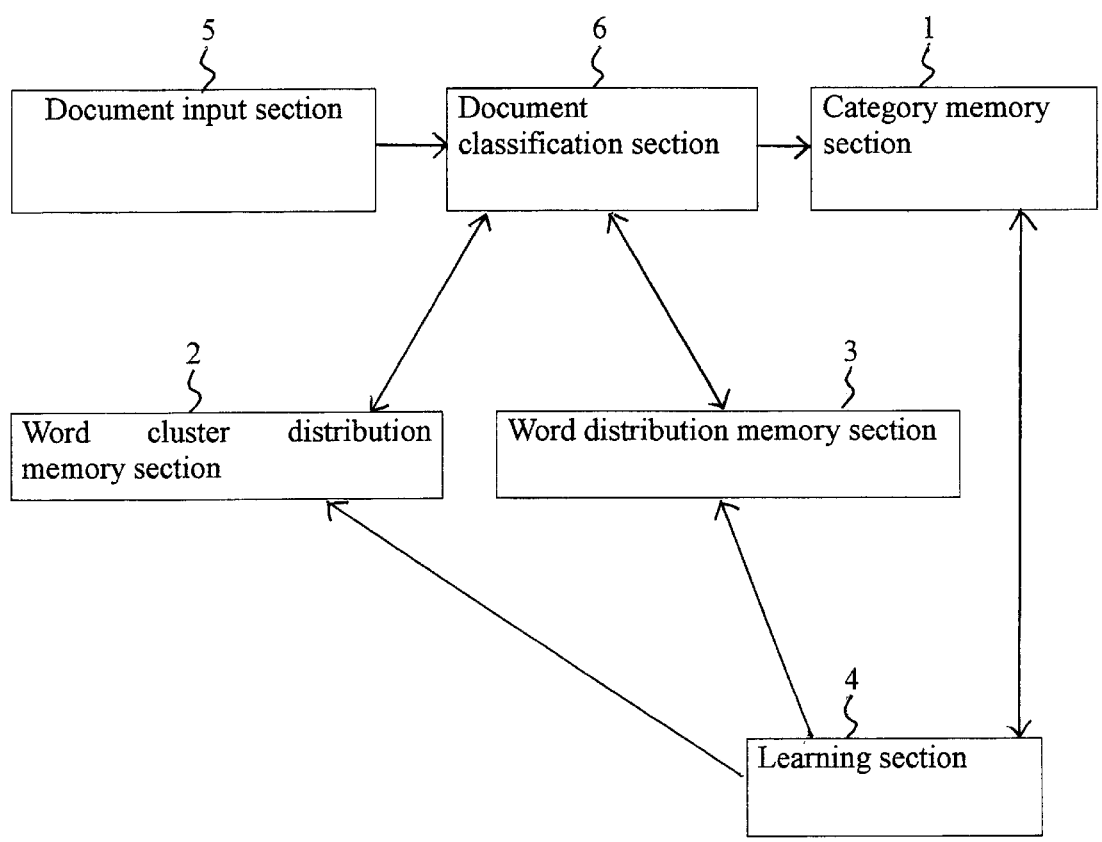
FIG. 2 is a block diagram illustrative of a novel document classification system in accordance with the present invention.

With reference to FIG. 2, a novel document classification system in accordance with the present invention comprises a category memory section 1 for storing categories and documents classified into those categories, a word cluster distribution memory section 2 for storing a distribution of word clusters in the category, a word distribution memory section 3 for storing a distribution of words in the word cluster, a learning section 4, a document classification section 6 and a document input section 5 for storing newly inputted documents into the document classification section 6.

Figure 3:
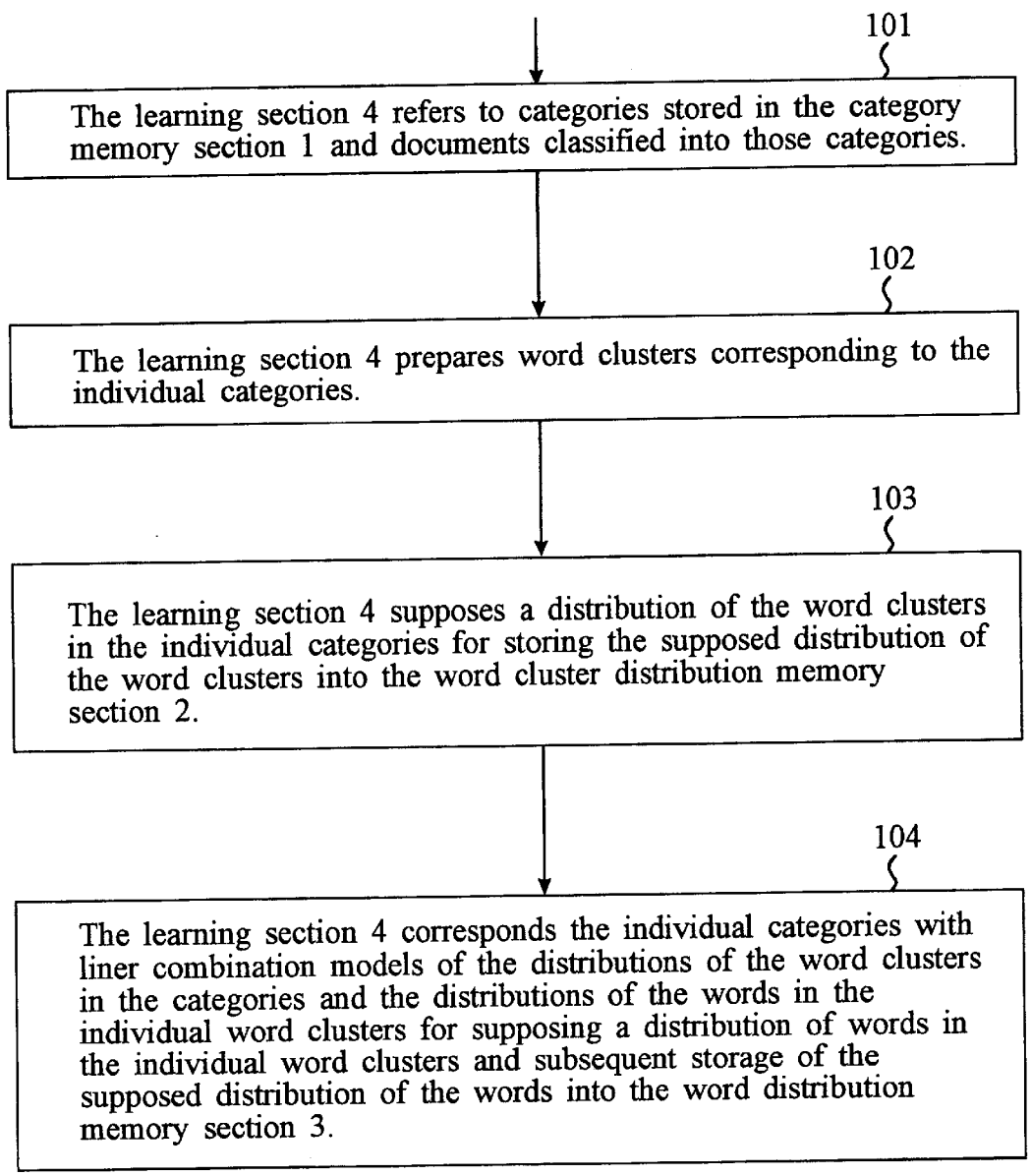
FIG. 3 is a flow chart illustrative of operations of the learning section in a novel document classification system in accordance with the present invention.

The learning section 4 operates as shown in FIG. 3. The learning section 4 refers to categories stored in the category memory section 1 and documents classified into those categories in the step 101 so that the learning section 4 prepares word clusters corresponding to the individual categories in the step 102. The learning section 4 assumes distribution of the word clusters in the individual categories for storing the assumed distribution of the word clusters into the word cluster distribution memory section 2 in the step 103. The learning section 4 associates the individual categories with linear combination models of the distributions of the word clusters in the categories and the distributions of the words in the individual word clusters for assuming a distribution of words in the individual word clusters and subsequently storing the assumed distribution of the words into the word distribution memory section 3 in the step 104.

Figure 4:
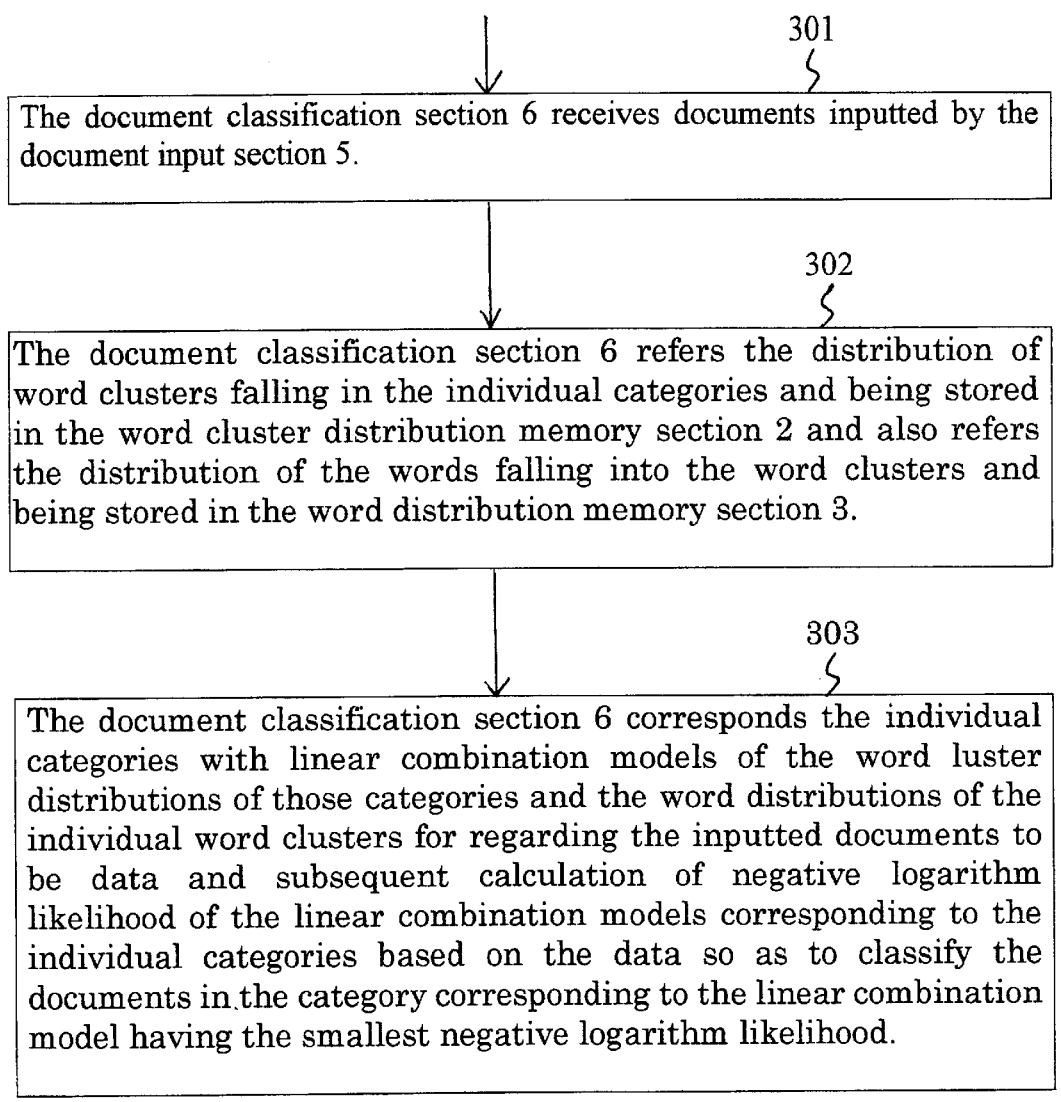
FIG. 4 is a flow chart illustrative of operations of the document classification section in a novel document classification system in accordance with the present invention.

The document classification section 6 operates as shown in FIG. 4. The document classification section 6 receives documents inputted by the document input section 5 in the step 301. The document classification section 6 refers to the distribution of word clusters falling in the individual categories stored in the word cluster distribution memory section 2 and also refers to the distribution of the words falling into the word clusters stored in the word distribution memory section 3 in the step 302. The document classification section 6 associates the individual categories with linear combination models of the word cluster distributions of those categories and the word distributions of the individual word clusters for regarding the inputted documents to be data and subsequent calculation of negative logarithm likelihood of the linear combination models corresponding to the individual categories based on the data so as to classify the documents in the category corresponding to the linear combination model having the smallest negative logarithm likelihood in the step 303.

PREFERRED EMBODIMENTS

First Embodiment:

A first embodiment according to the present invention will be described in detail with reference again to FIGS. 2–4.

Operation of the document classification system in this embodiment according to the present invention will be described. The category memory section 1 stores categories "$c_1$", "$c_2$" . . . "$c_n$" and documents classified into those categories. The categories to be stored and frequencies of appearance of words in the documents classified into those categories are shown in Table 6, where two categories "baseball" and "soccer" are present.

TABLE 6

| Category/Word | base | pitcher | goal | kick | spectator |
|---|---|---|---|---|---|
| Baseball | 3 | 1 | 1 | 0 | 2 |
| Soccer | 0 | 0 | 3 | 1 | 2 |

The learning section 4 prepares the word clusters in one-to-one correspondence to the categories.

The prepared word clusters are represented to be "$k_1$", "$k_2$", . . . "$k_n$". The word cluster "baseball" : words "base" and "pitcher" and the word cluster "soccer": words "goal" and "kick"0 are prepared. If the frequency of appearance of the words in the documents classified into the individual categories is not less than 40%, then the word is classified into the word cluster corresponding to that category. The words which could not be classified are ignored in the later process. From the above Table 6, the following word clusters are prepared.

Cluster "baseball": "base", "pitcher"
Cluster "Soccer": "goal", "kick"

Subsequently, the learning section 4 supposes a distribution of words in the individual word clusters for subsequent storage of the supposed distribution of the words into the word distribution memory section 3. The distribution of the words in the word cluster $k_i$ is represented as $P(W|k_i)$, where $k_i$ represents a word cluster and a random variable W takes as a value the frequency of the word falling into the word cluster $k_i$.

The learning section 4 supposes the distribution of the words in the individual word clusters based upon the following probability of appearance $P(W|k_i)$ in the word cluster $k_i$.

$$P(W|k_i) = f(w)/F \quad (2)$$

where $P(W|k_i)$ is the probability of appearance of the word "w" in the word cluster $k_i$, f(w) is the frequency of appearance of the word "w" throughout all documents, and F is the frequency of appearance of all words throughout all documents in the word cluster $k_i$.

Cluster "baseball": "base", "pitcher"
Cluster "Soccer": "goal", "kick"

The following distribution of the words from the above word cluster can be obtained.

Cluster "baseball": "base" 0.75, "pitcher" 0.25
Cluster "Soccer": "goal" 0.80, "kick" 0.20

The learning section 4 associates the individual categories with the linear combination models of the word cluster distribution of those categories and the word distribution of the individual word clusters. The linear combination model is defined as follows.

$$P(W|c) = \sum_{i=1}^{n} P(W|k_i) \times P(k_i|c) \quad (3)$$

$$P(W|k_i) = \begin{cases} P(W|k_i) & W \in k_i \\ 0 & \text{otherwise} \end{cases} \quad (3\text{-}1)$$

The learning section 4 supposes the distribution of the word cluster in the individual category and stores the supposed distribution of the word cluster into the word cluster distribution memory section 2. Normally, the distribution of the word cluster is represented to be $P(K|c)$, where c is the category and K is the value of the word cluster.

The learning section 4 supposes the distribution of the word cluster in the individual category by use of a Markov chain Monte-Carlo method with hidden variables.

For convenience in expression, $P(k_i|c)$ and $P(W|k_i)$ are expressed as follows.

$$P(k_i|c) = \theta_i, P(W|k_i) = P_i(W) \quad (4)$$

$$P(W|\theta) = \sum_{i=1}^{n} \theta_i \times P_i(W), \theta = (\theta_1, \theta_2, \theta_3, \ldots \theta_n) \quad (5)$$

Hidden variable Z is introduced, which is a vector having n parameters and only one of the parameters is 1 and the others are 0. For example, Z is expressed as follows.

$$Z = (0, \ldots, 0, 1, 0, \ldots, 0) \quad (6)$$

The hidden variable model will subsequently be defined. The hidden variable model may be expressed using joint distribution of W and Z as follows.

$$P(W, Z|\theta) = \sum_{i=1}^{n} \delta_i(Z) \times \theta \times P_i(W), \quad (7)$$

where $$\delta_i(Z) = \begin{cases} 1 & \text{if } Z = (z_1, z_{i-1}, z_i, z_{i+1}, \ldots, z_n) = (0, \ldots, 0, 1, 0, \ldots, 0) \\ 0 & \text{otherwise} \end{cases} \quad (8)$$

The marginal distribution with respect to W is as follows.

$$P(W|\theta) = \sum_{Z \in Z'} P(W, Z|\theta) \quad (9)$$

Figure 5:
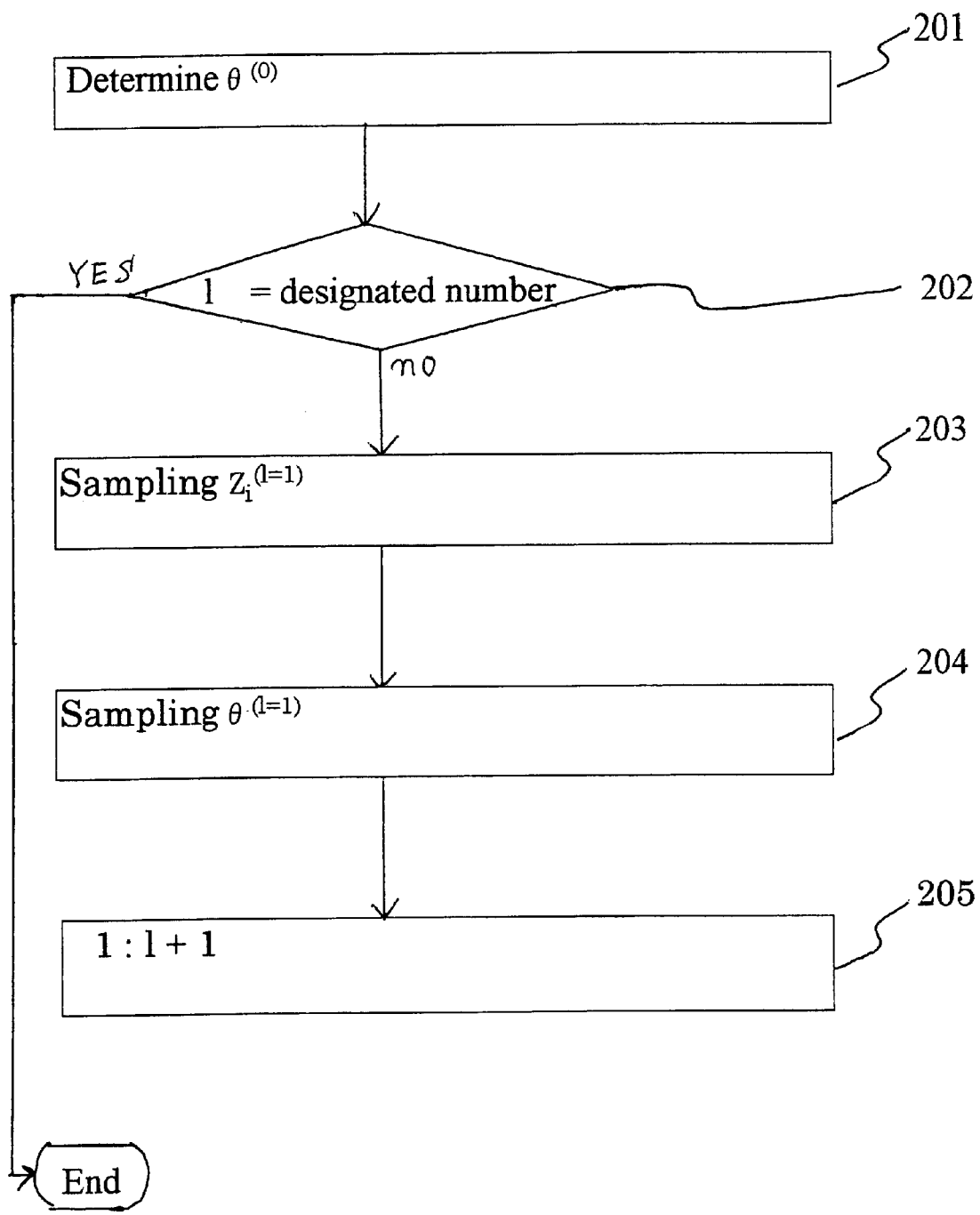
FIG. 5 is a flow chart of the processes for random samplings of Z and θ alternately and repeatedly to suppose θ in the equation (7).

It is now on consideration to suppose θ in the equation (7) The presumption of θ is made by random samplings of Z and θ alternately and repeatedly. FIG. 5 is a flow chart of the processes for random samplings of Z and θ alternately and repeatedly to suppose θ in the equation (7).

The Dirichlet Distribution $D(a_1, a_2, \ldots a_n: \theta)$ is defined. The "Dirichlet Distribution" means a probability distribution having a density function given by the following equation.

$$D(a_1, a_2, \ldots a_n: \theta) = \quad (10)$$
$$\{\Gamma(a_1 + a_2 + \ldots + a_n)\}/\{\Gamma(a_1)\ldots\Gamma(a_2)\ldots\Gamma(a_n)\}\theta_1^{a_1-1}\theta_2^{a_2-1},$$
$$\ldots \theta_n^{a_n-1}, 0 \leq \theta_i \leq 1, \sum_{i=1}^{n} \theta_i = 1$$

where $a_1, a_2, \ldots a_n$ is the parameters and Γ is the gamma function.

The initial value of θ (0) is properly found in the step 201. The sampling is repeated to find Z and θ. Supposing that θ(l) and Z(i) are the values obtained by the 1st sampling process. $l+1^{th}$ sampling process is made by random sampling of Zi (i=1, 2, ..., N) in accordance with the distribution of the following equation in the step 203.

$$Z_i^{(l+1)} \sim P(Z|W_i, \theta(l)) \quad (11)$$

where $W_i$ (i=1, 2, ..., N) are observation data. $P(Z_i|W_i, \theta)$ is given by the following equation.

$$P(Z_i|W_i, \theta) = P(Z_i, W_i|\theta)/P(W_i|\theta) \quad (12)$$

After $Z_i^{(l+1)}$ (i=1, 2, ..., N), namely $(Z^N)^{(l+1)}$ has been obtained, the random sampling of $\theta^{(l+1)}$ is made in accordance with the distribution of the following equation (13).

$$\theta^{(l+1)} \sim P(\theta|W^N, (Z^N)^{(l+1)}) \quad (13)$$

The previous distribution is expressed to be $D(a_1, a_2, \ldots a_n: \theta)$. $P(\theta|W^N, (Z^N))$ is given by the following equations.

$$P(\theta \mid W^N, Z^N) = D(a_1 + t_1, a_2 + t_2, \ldots a_n + t_n: \theta) \quad (14)$$

$$Z^N = Z_1, Z_2, \ldots, Z_N, Z_i, = (Z_{i1}, Z_{i2}, \ldots, Z_{in}) \quad (15)$$

$$tj = \sum_{i=1}^{n} Z_{ij} \quad (16)$$

The sampling is repeated as described above at a predetermined number of times to stop the processes. $\theta^{(l+1)}$ is considered to be the result of the presumption.

If the number of the sampling is sufficiently large, then $\theta^{(l+1)}$ may approximately be considered to have been subjected to the sampling in accordance with the post-distribution $P(\theta|W^N)$.

In the samples in accordance with the equation (10), available values of parameter $\theta$ are limited. For example, the parameter space is quantized to determine the available values of $\theta$ as follows. If the category is $c_i$, then values of $\theta_i$ are in the range of 0.5 to 1 where the values are increased by "r=0.05".

After the values of $\theta_i$ are determined, then the remaining parameters are determined in accordance with the following equation.

$$\theta_j = (1-\theta_j)/(n-1), j \neq i \quad (17)$$

The learning section 4 supposes the distribution of the word cluster in the individual category to store the supposed distribution of the word cluster into the word cluster memory section 2.

One example of the supposed distribution of the word cluster in the categories "baseball" and "soccer" is shown on the following table.

TABLE 6

| Category/ | cluster "baseball" | cluster "soccer" |
|---|---|---|
| Baseball | 0.90 | 0.10 |
| Soccer | 0.05 | 0.95 |

In the document classification, the document input section 5 inputs new documents into the document classification section 6.

The document classification section 6 receives the newly inputted document from the document input section 5 and refers to the word cluster distribution in the individual category stored in the word cluster distribution memory section 2 and also refers to the word distribution of the word cluster stored in the word distribution memory section 3. Subsequently, the document classification section 6 associates the individual category with the linear combination model of the word cluster distribution in that category and the word distribution of the individual word cluster in order to calculate the negative logarithm likelihood of the linear combination model corresponding to the individual category with respect to data upon consideration of the documents as those data, so that the document classification section 6 classifies the document into the category having the smallest negative logarithm likelihood.

With respect to the inputted document "d" or data, the negative logarithm likelihood L (d|c) of the linear combination model corresponding to the category "c" is calculated as follows.

Log(d|category "baseball")

=−log 0.25×0.90−log 0.75×0.90−log 0.75×0.90−log 0.80×0.10=6.93.

Log(d|category "soccer")

=−log 0.25×0.05−log 0.75×0.05−log 0.75×0.05−log 0.80×0.95=16.19.

where the words in the inputted document are "spectator", "pitcher", "base", "base" and "goal". The word cluster distribution in the individual category is shown on the following table.

TABLE 7

| Category/Word | base | pitcher | goal | kick | spectator |
|---|---|---|---|---|---|
| Baseball | 3 | 1 | 1 | 0 | 2 |
| Soccer | 0 | 0 | 3 | 1 | 2 |

The document classification section 6 classifies the document d into the category having the smallest negative logarithm likelihood. In this case, the category "baseball" is smaller in negative logarithm likelihood than the category "soccer", for which reason the document d is classified into the category "baseball".

In accordance with the present invention, for classification of words into the word clusters, a word falls into a word cluster at a probability, and a linear combination model between a distribution of word clusters in a category and a distribution of words in the word cluster is made to correspond to that category for realizing a highly accurate document classification as compared to the conventional document classification such as proposed by Guthrie et al.

Further, in accordance with the present invention, since the word falls into the word cluster at a probability, it is possible to solve the problem with the prior art in that the words classified into the same word cluster. It is also possible to the other problem with the prior art in that it is difficult to set a threshold value of the frequency of appearance of words in preparation of the word cluster.

Furthermore, the linear combination model of the distribution of word clusters in the category and the distribution of words in the word cluster is made to correspond to that category, for which reason it is possible to settle the problem with the prior art that if a word appears in the documents classified into the plural categories but appears to be biased in the document classified into one category, then it is difficult to effectively utilize the word.

A second embodiment according to the present invention will be described in detail with reference again to FIG. 2.

The novel document classification system in this second embodiment is different from that of the first embodiment only in that the learning section 4 supposes the distribution of the word clusters in the individual categories at a different algorithm than that in the first embodiment.

The issue of supposing the word cluster distribution in the individual category is considered to be the issue of supposing the largest likelihood or the issue of taking the maximum value of the equation.

In accordance with either the following equation (20) or (21), repeated calculations are made to find $\theta$.

$$L(\theta) = \sum_{j=1}^{N} \log\left[\sum_{i=1}^{m} \theta_i P_i(W_j)\right] \quad (18)$$

$$\nabla L(\theta) = [\{\partial L(\theta)/\partial \theta_1\} \ldots \{\partial L(\theta)/\partial \theta_m\}] \quad (19)$$

$$\theta_i^{(l+1)} = [\theta_i^{(l)} \exp(\eta \nabla L(\theta^{(l)})_i)] \bigg/ \left[\sum_{i=1}^{m} \theta_i^{(l)} \exp(\eta \nabla L(\theta^{(l)})_i)\right] \quad (20)$$

$$\theta_i^{(l+1)} = \theta_i^{(l+1)} \{\eta \nabla L(\theta^{(l)})_l - 1\} + 1 \quad (21)$$

In accordance with the present invention, for classification of words into the word clusters, a word falls into a word cluster at a probability, and a linear combination model between a distribution of word clusters in a category and a distribution of words in the word cluster is made to correspond to that category for realizing a highly accurate document classification as compared to the conventional document classification such as proposed by Guthrie et al.

Further, in accordance with the present invention, since the word falls into the word cluster at a probability, it is possible to solve the problem with the prior art where words are classified into the same word cluster. It is also possible to the other problem with the prior art in that it is difficult to set a threshold value of the frequency of appearance of words in preparation of the word cluster.

Furthermore, the linear combination model of the distribution of word clusters in the category and the distribution of words in the word cluster is made to correspond to that category, for which reason it is possible to settle the problem with the prior art that if a word appears in the documents classified into the plural categories but appears to be biased in the document classified into one category, then it is difficult to effectively utilize the word.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A document classification system comprising:

a category memory section storing document categories;

a word cluster distribution memory section storing word cluster distributions for each of the document categories;

a word distribution memory section storing classification words and classification word distributions for each of the word clusters;

a learning section connected to each said memory section that prepares the word cluster distributions in each of the document categories and provides the word cluster distributions to said word cluster distribution memory section, and that prepares the word distributions in each of the word clusters and provides the word distributions to said word distribution memory section; and a document classification section that classifies a document based on linear combination models, there being one of the linear combination models for each of the document categories, each of the linear combination models linearly combining a respective one of the word distributions times a respective one of the word cluster distributions for each of the classification words in the document and has the form:

$$P(W \mid c) = \sum_{i=1}^{n} (P(W \mid k_i) \times P(k_i \mid c))$$

where $P(W|c)$ is a probability that the document W is in the document category c, $P(W|k_i)$ is a probability of appearance of the classification word w in the word cluster $k_i$, $P(k_i|c)$ is a probability of appearance of the word cluster $k_i$ in the document category c, and n is a number of the classification words in the document W.

2. A method of classifying a document into one of plural document categories comprising the steps of:

identifying classification words in each word cluster in each of the plural document categories;

determining word cluster distributions for each of the document categories from a learning set of documents;

determining classification word distributions for each of the word clusters from the learning set of documents;

compiling a linear combination model for each of the document categories, each of the linear combination models linearly combining a respective one of the word distributions times a respective one of the word cluster distributions for each of the classification words in a document being classified and has the form:

$$P(W \mid c) = \sum_{i=1}^{n} (P(W \mid k_i) \times P(k_i \mid c))$$

where $P(W|c)$ is a probability that the document W is in the document category c, $P(W|k_i)$ is a probability of appearance of the classification word w in the word cluster $k_i$, $P(k_i|c)$ is a probability of appearance of the word cluster $k_i$ in the document category c, and n is a number of the classification words in the document W; and comparing the compiled linear combination models to determine the one of the document categories for the document being classified.

* * * * *